United States Patent
Yang

(10) Patent No.: US 10,592,761 B2
(45) Date of Patent: Mar. 17, 2020

(54) IMAGE PROCESSING METHOD AND DEVICE

(71) Applicant: BOE TECHNOLOGY GROUP CO., LTD., Beijing (CN)

(72) Inventor: Jinglin Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 144 days.

(21) Appl. No.: 15/915,954

(22) Filed: Mar. 8, 2018

(65) Prior Publication Data
US 2019/0073552 A1   Mar. 7, 2019

(30) Foreign Application Priority Data
Sep. 1, 2017   (CN) .......................... 2017 1 0778512

(51) Int. Cl.
*G06K 9/32*   (2006.01)
*G06K 9/68*   (2006.01)
*G06K 9/62*   (2006.01)

(52) U.S. Cl.
CPC ......... *G06K 9/3208* (2013.01); *G06K 9/6204* (2013.01); *G06K 9/6857* (2013.01)

(58) Field of Classification Search
CPC ... G06K 9/3208; G06K 9/6857; G06K 9/6204
See application file for complete search history.

(56) References Cited

U.S. PATENT DOCUMENTS

| 4,581,762 | A | * | 4/1986 | Lapidus | ................. | G06T 7/001 |
|---|---|---|---|---|---|---|
| | | | | | | 348/130 |
| 6,044,125 | A | * | 3/2000 | Flohr | ....................... | G06T 5/20 |
| | | | | | | 378/4 |
| 8,885,882 | B1 | * | 11/2014 | Yin | .......................... | G06F 3/00 |
| | | | | | | 382/103 |
| 2008/0013836 | A1 | * | 1/2008 | Nakamura | .......... | G06K 9/4642 |
| | | | | | | 382/209 |
| 2009/0148022 | A1 | * | 6/2009 | Lee | ............................ | G06T 7/60 |
| | | | | | | 382/132 |
| 2010/0067826 | A1 | | 3/2010 | Honsinger et al. | | |

(Continued)

FOREIGN PATENT DOCUMENTS

| CN | 101950419 A | 1/2011 |
|---|---|---|
| CN | 103456005 A | 12/2013 |

(Continued)

OTHER PUBLICATIONS

First Office Action for Chinese Application No. 201710778512.4, dated Dec. 17, 2019, 7 Pages.

(Continued)

*Primary Examiner* — Wesley J Tucker
(74) *Attorney, Agent, or Firm* — Brooks Kushman P.C.

(57) ABSTRACT

The present disclosure discloses an image processing method and device. The image processing method includes: dividing a detection image into a plurality of first subregions, dividing a template image into a plurality of second subregions, calculating a principal rotation direction of each first subregion with respect to the corresponding second subregion; and calculating a principal rotation direction of the detection image according to the principal rotation directions of the plurality of first subregions.

20 Claims, 4 Drawing Sheets

--- dividing a detection image into a plurality of first subregions and dividing a template image into a plurality of second subregions according to a same preset rule, wherein a center of each of the plurality of first subregions coincides with a center of the detection image, a center of each of the plurality of second subregions coincides with a center of the template image

↓ calculating a principal rotation direction of each of the plurality of first subregions with respect to corresponding second subregion, wherein the principal rotation direction of the first subregion with respect to the corresponding second subregion is an average value of sums of difference values of Δp of all pixel points p on an outer contour line of the first subregion and Δp' of corresponding pixel points p' on an outer contour line of the corresponding second subregion, Δp is an angle between a radial direction and a gradient direction of each pixel point p, and Δp' is an angle between a radial direction and a gradient direction of each pixel point p'

↓ calculating a principal rotation direction α of the detection image according to the principal rotation directions of the plurality of first subregions of the detection image

(56) References Cited

U.S. PATENT DOCUMENTS

2013/0058582 A1\* 3/2013 Van Beek ............ G06K 9/6204
382/221

FOREIGN PATENT DOCUMENTS

| CN | 103714344 A | 2/2017 |
|---|---|---|
| JP | H1027253 A | 1/1998 |

OTHER PUBLICATIONS

Ding et al, "Palmprint Palm Vein Fusion Recognition Technology and Its Application in Pan-subway Environment," Jan. 31, 2017, pp. 55-57, Shanghai Science and Technology Press (8 Pages).
Zhao et al, A Fast Electronic Image Stabilization Algorithm of Video Sequences Based on Gray Projection and Block Matching, Opto-Electronic Engineering, Jun. 30, 2011, pp. 146-150, vol. 38, Iss. 6, China Academic Journal Electronic Publishing House (5 Pages).

\* cited by examiner

IMAGE PROCESSING METHOD AND DEVICE

CROSS-REFERENCE TO RELATED APPLICATION

This application claims priority to Chinese Patent Application No. 201710778512.4 filed on Sep. 1, 2017, which is incorporated herein by reference in its entirety.

TECHNICAL FIELD

The present disclosure relates to a field of image processing technologies, in particular to an image processing method and device.

BACKGROUND

In detection of a target image, template matching is commonly adopted, e.g., feature extraction and matching is performed on the target image to be detected with a template. However, in practice, a pose of the target image to be detected tends to be different from that of a template image to some extent. For example, the target image is rotated by a certain angle with respect to the template image. Therefore, it is necessary for a detection algorithm to have a relatively strong rotational invariance, and a direction of the target image is adjusted by determining a rotation angle of the target image; afterwards, the feature extraction and matching is performed on the target image. However, the detection algorithm is relatively complicated, and the image identification has a relatively low reliability.

SUMMARY

The present disclosure provides an image processing method and device, so as to provide a method for acquiring a principal rotation direction of a detection image with respect to a template image.

In one aspect, some embodiments of the present disclosure provides an image processing method, including: dividing a detection image into a plurality of first subregions, and dividing a template image into a plurality of second subregions, wherein a center of each of the plurality of first subregions coincides with a center of the detection image, a center of each of the plurality of second subregions coincides with a center of the template image, and the plurality of first subregions is in one-to-one correspondence to the plurality of second subregions; calculating a principal rotation direction of each of the plurality of first subregions with respect to corresponding second subregion, wherein the principal rotation direction of the first subregion with respect to the corresponding second subregion is an average value of sums of difference values of Δp of all pixel points p on an outer contour line of the first subregion and Δp' of corresponding pixel points p' on an outer contour line of the corresponding second subregion, Δp is an angle between a radial direction and a gradient direction of each pixel point p, and Δp' is an angle between a radial direction and a gradient direction of each pixel point p'; and calculating a principal rotation direction α of the detection image according to the principal rotation directions of the plurality of first subregions of the detection image.

Optionally, the calculating the principal rotation direction α of the detection image according to the principal rotation directions of the plurality of first subregions of the detection image includes: step S1 of setting i=1; step S2 of comparing $\alpha_i$ with $\alpha_{i+1}$, and adjusting the principal rotation direction of the detection image using an equation:

$$\alpha = \arctan\left(\frac{\sum_{u=1}^{u=i+1} \sin \alpha_u}{\sum_{u=1}^{u=i+1} \cos \alpha_u}\right)$$

in the case that $|\alpha_i - \alpha_{i+1}| \leq \omega$, wherein u≤n, u is a positive integer, and $\alpha_i$ represents the principal rotation direction of an $i^{th}$ first subregion of the plurality of first subregions; step S3 of assigning i=i+1; and in the case that i is less than n, repeating steps S2 and S3, wherein n represents the number of the plurality of first subregions.

Optionally, before the step S1, the image processing method further includes: sorting the principal rotation directions of the plurality of first subregions such that $\alpha_i > \alpha_{i+1}$.

Optionally, ω=45°.

Optionally, before the step of calculating a principal rotation direction of each of the plurality of first subregions with respect to corresponding second subregion, the image processing method further includes: selecting a circular region with one pixel point p on an outer contour line of each of the first subregions as a center of the circular region, dividing the circular region into v concentric circles with the pixel point p as a center of the circles, and equally dividing the circular region into w sector regions with the pixel point p as a vertex of the sector regions, to obtain v*w third subregions, wherein v and w are positive integers greater than or equal to 2; calculating a sum θ of gradient directions of all the pixel points in each of the third subregions; calculating a gradient direction $\theta_p$ of the pixel point p, wherein $\theta_p$ is a sum of products of θ of all the third subregions and corresponding assigned weights ε, and ε is directly proportional to a distance between a central point of the third subregion and the pixel point p.

Optionally, the dividing the circular region into v concentric circles with the pixel point p as a center of the circles, and equally dividing the circular region into w sector regions with the pixel point p as a vertex of the sector regions, to obtain v*w third subregions includes: dividing the circular region into two concentric circles with the pixel point p as the center of the circles, and dividing the circular region into 8 sector regions with the pixel point p as the vertex of the sector regions, to obtain 16 third subregions.

Optionally, before the step of calculating a principal rotation direction of each of the plurality of first subregions with respect to corresponding second subregion, the image processing method further includes: selecting a circular region with one pixel point p' on an outer contour line of each of the second subregions as a center of the circular region, dividing the circular region into v concentric circles with the pixel point p' as a center of the circles, and equally dividing the circular region into w sector regions with the pixel point p' as a vertex of the sector regions, to obtain v*w fourth subregions; calculating a sum θ' of gradient directions of all the pixel points in each of the fourth subregions; and calculating a gradient direction $\theta_p'$ of the pixel point p', wherein $\theta_p'$ is a sum of products of θ' of all the fourth subregions and corresponding assigned weights ε', ε' is directly proportional to a distance between a central point of the fourth subregion and the pixel point p', and v and w are positive integers greater than or equal to 2.

Optionally, the detection image is a circular region; the dividing the detection image into a plurality of first subregions includes: defining a region where a distance from the center of the detection image is less than $r_i$ and greater than $r_{i-1}$ as the $i^{th}$ first subregion of the plurality of first subregions, wherein $r_{i-1}<r_i$, $r_0=0$, i is a positive integer and runs from 1 to n, and n represents the number of the first subregions; the dividing the template image into a plurality of second subregions includes: defining a region where a distance from the center of the template image is less than $r_i$ and greater than $r_{i-1}$ as the $i^{th}$ second subregion of the plurality of second subregions, wherein $r_{i-1}<r_i$, $r_0\geq 0$, i is a positive integer and runs from 1 to n, and n represents the number of the second subregions; and the calculating a principal rotation direction of each of the plurality of first subregions of the detection image with respect to corresponding second subregion includes: determining the principal rotation direction of the detection image with a radius of $r_i$ with respect to the template image with a radius of $r_i$ as the principal rotation direction $\alpha_i$ of the $i^{th}$ first subregion with respect to the corresponding second subregion.

Optionally, before the step of calculating a principal rotation direction of each of the plurality of first subregions with respect to corresponding second subregion, the image processing method further includes: establishing a coordinate system with a center of the detection image as an origin; calculating a radial direction $\varphi_p$ of one pixel point p on an outer contour line of each of the first subregions using an equation $$\varphi_p = \arctan\frac{\Delta p_y}{\Delta p_x},$$

wherein $(\Delta p_x, \Delta p_y)$ is coordinates of the pixel point p, and $0\leq\varphi_p<2\pi$.

Optionally, before the step of calculating a principal rotation direction of each of the plurality of first subregions with respect to corresponding second subregion, the image processing method further includes: establishing a coordinate system with a center of the template image as an origin; calculating a radial direction $\varphi_p'$ of one pixel point p' on an outer contour line of each of the second subregions using an equation $$\varphi_p' = \arctan\frac{\Delta p_y'}{\Delta p_x'},$$

wherein $(\Delta p_x', \Delta p_y')$ is coordinates of the pixel point p', and $0\leq\varphi_p'<2\pi$.

In another aspect, some embodiments of the present disclosure provides an image processing device, including: a processor and a memory, wherein the processor is configured to execute a program stored in the memory, so as to: divide a detection image into a plurality of first subregions, and divide a template image into a plurality of second subregions, wherein a center of each of the plurality of first subregions coincides with a center of the detection image, a center of each of the plurality of second subregions coincides with a center of the template image, and the plurality of first subregions is in one-to-one correspondence to the plurality of second subregions; calculate a principal rotation direction of each of the plurality of first subregions with respect to corresponding second subregion, wherein the principal rotation direction of the first subregion with respect to the corresponding second subregion is an average value of sums of difference values of $\Delta p$ of all pixel points p on an outer contour line of the first subregion and $\Delta p'$ of corresponding pixel points p' on an outer contour line of the corresponding second subregion, $\Delta p$ is an angle between a radial direction and a gradient direction of each pixel point p, and $\Delta p'$ is an angle between a radial direction and a gradient direction of each pixel point p'; and calculate a principal rotation direction $\alpha$ of the detection image according to the principal rotation directions of the plurality of first subregions of the detection image.

Optionally, the processor is further configured to execute following steps: step S1 of setting i=1; step S2 of comparing $\alpha_i$ with $\alpha_{i+1}$, and adjusting the principal rotation direction of the detection image using an equation:

$$\alpha = \arctan\left(\frac{\sum_{u=1}^{u=i+1}\sin\alpha_u}{\sum_{u=1}^{u=i+1}\cos\alpha_u}\right)$$

in the case that $|\alpha_i-\alpha_{i+1}|\leq\omega$, wherein $u\leq n$, u is a positive integer, and $\alpha_i$ represents the principal rotation direction of an $i^{th}$ first subregion of the plurality of first subregions; step S3 of assigning i=i+1; and in the case that i is less than n, repeating steps S2 and S3, wherein n represents the number of the plurality of first subregions.

Optionally, the processor is further configured to, before the step S1, sort the principal rotation directions of the plurality of first subregions such that $\alpha_i>\alpha_{i+1}$.

Optionally, $\omega=45°$.

Optionally, the processor is further configured to: select a circular region with one pixel point p on an outer contour line of each of the first subregions as a center of the circular region, divide the circular region into v concentric circles with the pixel point p as a center of the circles, and equally divide the circular region into w sector regions with the pixel point p as a vertex of the sector regions, to obtain v*w third subregions, wherein v and w are positive integers greater than or equal to 2; calculate a sum $\theta$ of gradient directions of all the pixel points in each of the third subregions; and calculate a gradient direction $\theta_p$ of the pixel point p, wherein $\theta_p$ is a sum of products of $\theta$ of all the third subregions and corresponding assigned weights c, and c is directly proportional to a distance between a central point of the third subregion and the pixel point p.

Optionally, the processor is further configured to divide the circular region into two concentric circles with the pixel point p as the center of the circles, and divide the circular region into 8 sector regions with the pixel point p as the vertex of the sector regions, to obtain 16 third subregions.

Optionally, the processor is further configured to: select a circular region with one pixel point p' on an outer contour line of each of the second subregions as a center of the circular region, divide the circular region into v concentric circles with the pixel point p' as a center of the circles, and equally divide the circular region into w sector regions with the pixel point p' as a vertex of the sector regions, to obtain v*w fourth subregions; calculate a sum $\theta'$ of gradient directions of all the pixel points in each of the fourth subregions; and calculate a gradient direction $\theta_p'$ of the pixel point p', wherein $\theta_p'$ is a sum of products of $\theta'$ of all the fourth subregions and respective corresponding assigned weights $\varepsilon'$, $\varepsilon'$ is directly proportional to a distance between a central point of the fourth subregion and the pixel point p', and v and w are positive integers greater than or equal to 2.

Optionally, the detection image is a circular region, and the processor is further configured to: define a region where a distance from the center of the detection image is less than $r_i$ and greater than $r_{i-1}$ as the $i^{th}$ first subregion of the plurality of first subregions, wherein $r_{i-1}<r_i$, $r_0=0$, i is a positive integer and runs from 1 to n, and n represents the number of the first subregions; define a region where a distance from the center of the template image is less than $r_i$ and greater than $r_{i-1}$ as the $i^{th}$ second subregion of the plurality of second subregions, wherein $r_{i-1}<r_i$, $r_0 \geq 0$, i is a positive integer and runs from 1 to n, and n represents the number of the second subregions; and determine the principal rotation direction of the detection image with a radius of $r_i$ with respect to the template image with a radius of $r_i$ as the principal rotation direction $\alpha_i$ of the $i^{th}$ first subregion with respect to the corresponding second subregion.

Optionally, the processor is further configured to: establish a coordinate system with a center of the detection image as an origin; and calculate a radial direction of one pixel point p on an outer contour line of each of the first subregions using an equation $$\varphi_p = \arctan \frac{\Delta p_y}{\Delta p_x},$$

wherein $(\Delta p_x, \Delta p_y)$ is coordinates of the pixel point p, and $0 \leq \varphi_p < 2\pi$.

Optionally, the processor is further configured to: establish a coordinate system with a center of the template image as an origin; calculate a radial direction of one pixel point p' on an outer contour line of each of the second subregions to using an equation $$\varphi'_p = \arctan \frac{\Delta p'_y}{\Delta p'_x},$$

wherein $(\Delta p'_x, \Delta p'_y)$ is coordinates of the pixel point p', and $0 \leq \varphi'_p < 2\pi$.

BRIEF DESCRIPTION OF THE DRAWINGS

In order to more clearly describe the technical solutions of the embodiments of the present invention or the prior art, the drawings to be used in the descriptions of the embodiments or the prior art are briefly introduced as follows. Obviously, the following drawings just illustrate some embodiments of the present invention, and a person skilled in the art can obtain other drawings from these drawings without paying any creative effort.

DETAILED DESCRIPTION

The present disclosure is below further described in detail in combination with drawings and specific embodiments. The following embodiments are used for explaining the present disclosure, but not to limit the scope thereof.

The present embodiment provides an image processing method for acquiring a detection image, and matching the detection image with a template image, so as to perform identification detection on the target. The detection image may be an image of the entire target, or a part of the target image.

The image processing method includes the steps of a method for obtaining a principal rotation direction of an image, so as to acquire the principal rotation direction of the detection image with respect to the template image, and the principal direction of rotation includes a rotation angle and a rotation direction. In the image processing method, firstly, the detection image is rotated according to the principal rotation direction, so that a pose of the detection image is the same as that of the template image, without a rotation angle, then the feature extraction and matching is performed on the rotated detection image and template image, so as to realize the identification detection of the target. Since the rotated detection image has the same pose as the template image, without a rotation angle, the subsequent image identification processing algorithm may not have the rotation invariance, which simplifies the image identification processing algorithm and improves the reliability of the image identification detection.

The steps of the method for acquiring a principal direction of rotation of the image include: acquiring a principal rotation direction of the detection image with respect to the template image.

Figure 8:
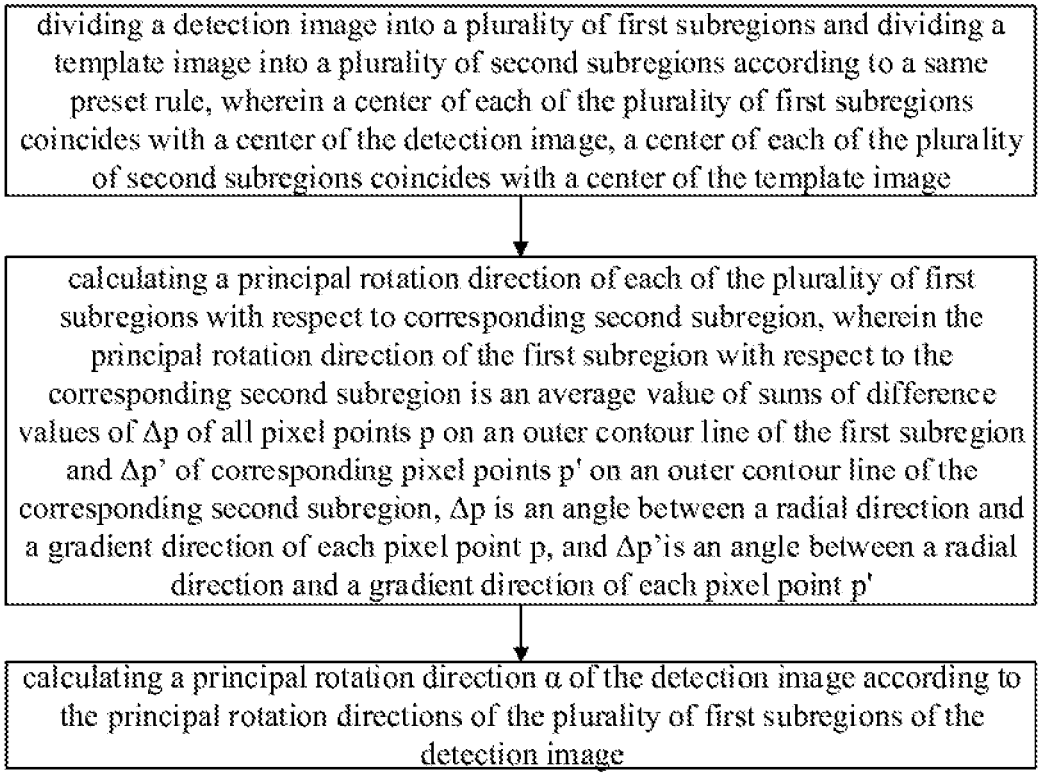
FIG. 8 is a flowchart showing a method for acquiring a principal rotation direction of a detection image with respect to a template image according to some embodiments of the present disclosure.

Exemplarily, as shown in FIG. 8, the acquiring the principal rotation direction of the detection image with respect to the template image includes the following steps.

According to a same preset rule, the detection image is divided into a plurality of first subregions, and the template image is divided into a plurality of second subregions, wherein a center of each of the plurality of first subregions coincides with a center of the detection image, and a center of each of the plurality of second subregions coincides with a center of the template image.

A principal rotation direction of each of the plurality of first subregions with respect to the corresponding second subregion is calculated. The principal rotation direction of the first subregion with respect to the corresponding second subregion is an average value of sums of difference values of $\Delta p$ of all pixel points p on an outer contour line of the first subregion and Δp' of corresponding pixel points p' on an outer contour line of the corresponding second subregion, wherein Δp is an angle between a radial direction and a gradient direction of each pixel point p, and Δp' is an angle between a radial direction and a gradient direction of each pixel point p'. The principal rotation direction α of the detection image is calculated according to the principal rotation directions of all first subregions of the detection image.

Optionally, the centers of the plurality of first subregions are the same, the centers of the plurality of second subregions are the same, and the plurality of first subregions is in one-to-one correspondence to the plurality of second subregions. Optionally, any one of the first subregions has the same shape and size as its corresponding second subregion.

In the above-mentioned image processing method, firstly, the detection image and the template image are divided into a plurality of subregions according to the same rule, a principal rotation direction of each of the plurality of first subregions of the detection image with respect to the corresponding subregion of the template image is calculated, and then the principal rotation direction of the detection image is calculated according to the principal rotation directions of all the subregions of the detection image, wherein the principal rotation direction of each subregion of the detection image with respect to the corresponding subregion of the template image is an average value of sums of difference values of an angle between the radial direction and the gradient direction of each of all pixel points on an outer contour line of each of the subregions of the detection image and an angle between the radial direction and the gradient direction of the corresponding pixel point on an outer contour line of the corresponding subregion of the template image. By adopting the angle between the radial direction and the gradient direction of the pixel point, the principal rotation direction of the image is acquired, with a relatively high accuracy and precision. By rotating the detection image in the principal rotation direction, the detection image has the same pose as the template image, without a rotation angle, so the subsequent image identification processing algorithm may not have the rotation invariance, which simplifies the image identification processing algorithm and improves the reliability of the image identification detection.

The principal rotation direction of each of the first subregions of the detection image with respect to the corresponding second subregion of the template image may be positive or negative, and the acquired principal rotation direction α of the detection image may also be positive or negative, so as to represent the counterclockwise rotation or clockwise rotation of the detection image with respect to the template image. In the case that a is set to be positive, the detection image counterclockwise rotates with respect to the template image; whereas in the case that a is negative, the detection image clockwise rotates with respect to the template image.

In the present embodiment, the step of dividing the detection image and the template image into a plurality of subregions according to the same preset rule means that all the subregions of the detection image and the template image have the same shape and size, a center of each of the plurality of first subregions coincides with a center of the detection image; and a center of each of the plurality of second subregions coincides with a center of the template image.

As shown in FIGS. 1, and 4-7, taking the detection image as an example, the division of the detection image into a plurality of subregions according to the preset rule means that the center of the detection image is taken as a center of each of the plurality of subregions (for example, the center of each subregion coincides with the center of the detection image), and the detection image is divided into a plurality of subregions using a plurality of graphics which are the same, not exactly the same or totally different. It should be noted that the same and different graphics herein only refers to their shapes. For the sake of convenient description, in Figures, four subregions are described schematically. It should be understood that the number of subregions is not limited in the embodiment of the present disclosure, and the detection image may also be divided into two or more than two subregions.

Figure 1:
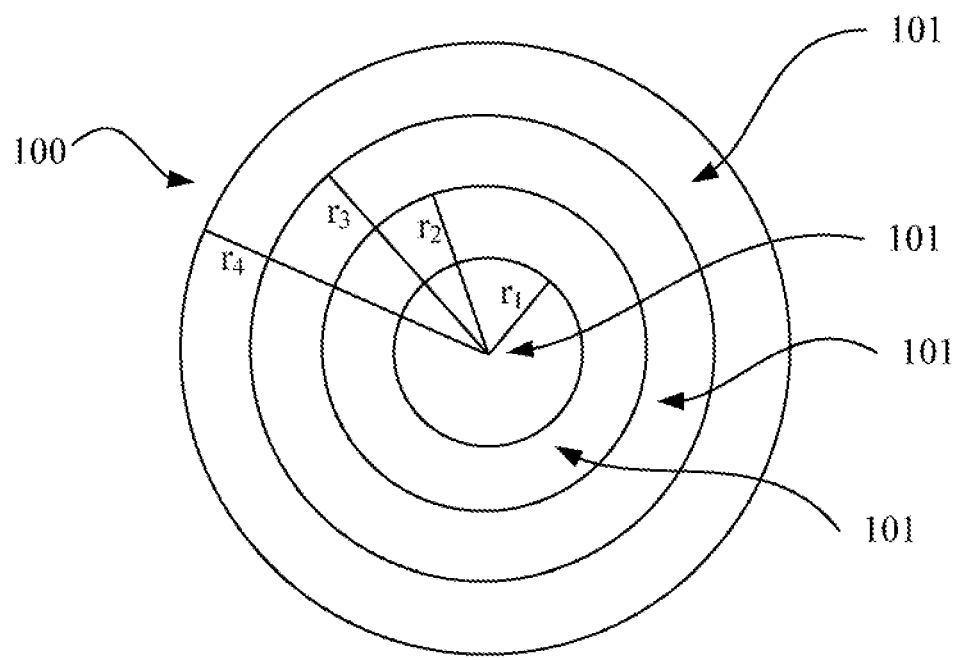
FIG. 1 represents a first schematic diagram of dividing a detection image into a plurality of first subregions according to some embodiments of the present disclosure.
Figure 4:
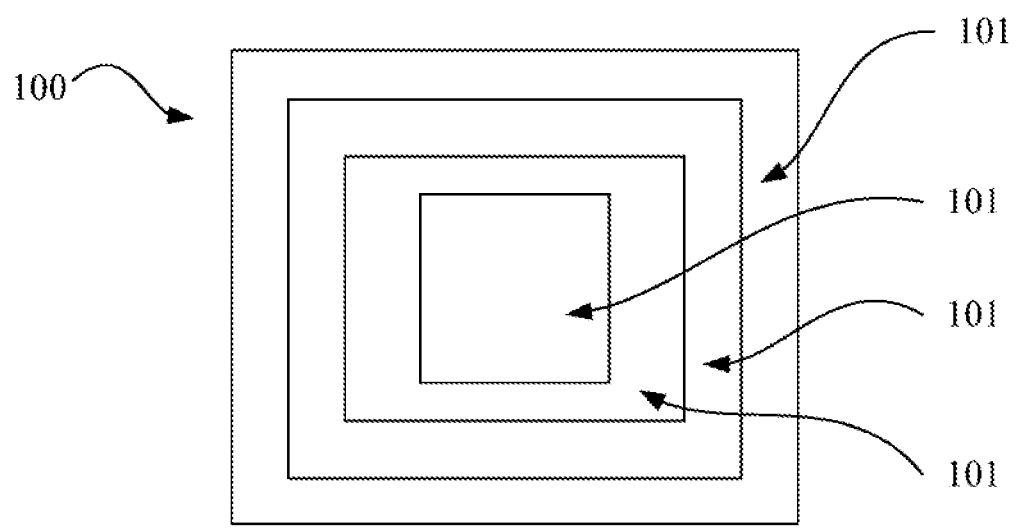
FIG. 4 represents a second schematic diagram of a detection image into a plurality of first subregions according to some embodiments of the present disclosure.

As shown in FIG. 1, the detection image 100 is divided into a plurality of concentric first subregions, wherein the first subregion 101-1 is a circular region, and other first subregions (for example, first subregions 101-2, 101-3 and 101-4) are circular ring-shaped regions. As shown in FIG. 4, the detection image 400 is divided into a plurality of concentric first subregions, wherein one first subregion (e.g., the first subregion 401-1) is a rectangular region, and other first subregions (for example, first subregions 401-2, 401-3 and 401-4) are rectangular ring-shaped regions. It should be understood that a boundary line of two adjacent first subregions and a boundary line surrounding all the first subregions may be circular, rectangular or of other shapes (for example, an oval).

Figure 5:
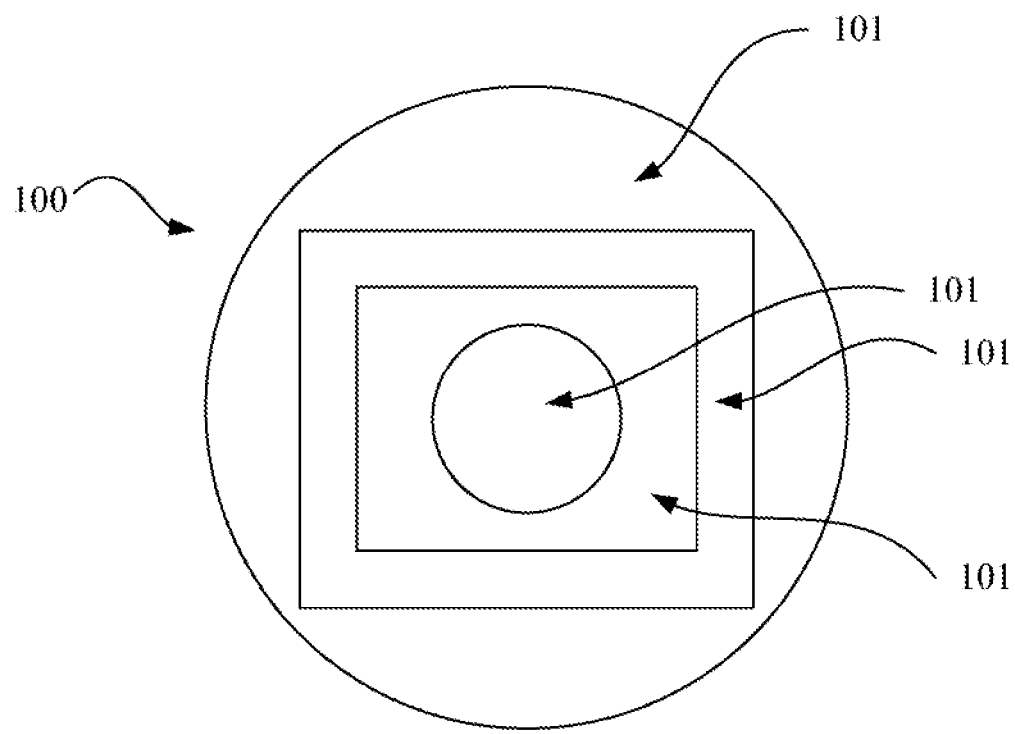
FIG. 5 represents a third schematic diagram of dividing a detection image into a plurality of first subregions according to some embodiments of the present disclosure.
Figure 6:
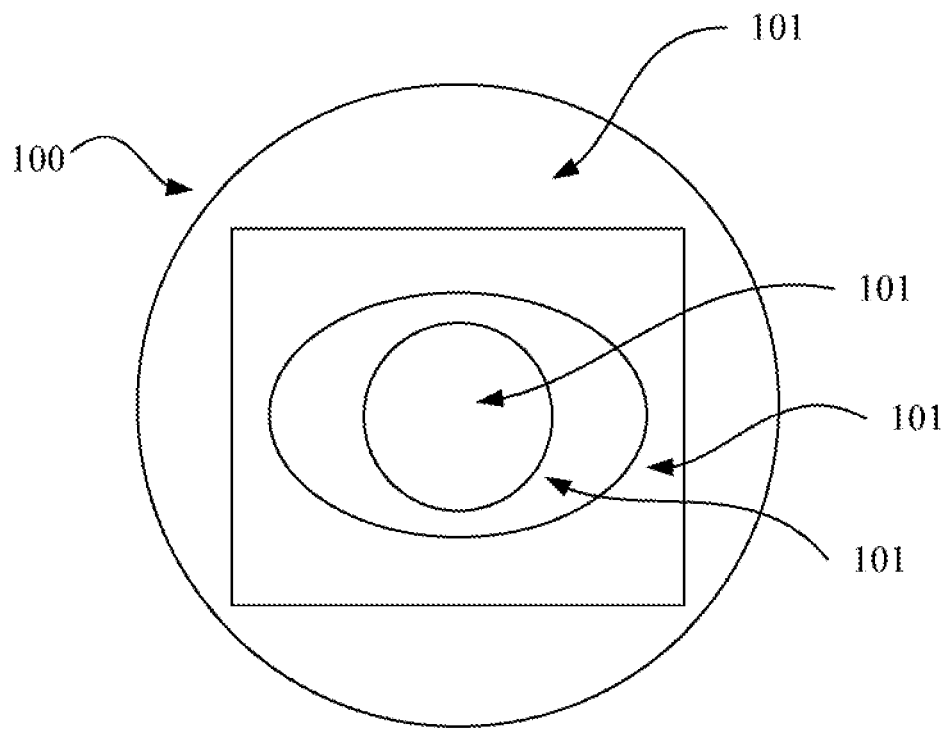
FIG. 6 represents a fourth schematic diagram of dividing a detection image into a plurality of first subregions according to some embodiments of the present disclosure.
Figure 7:
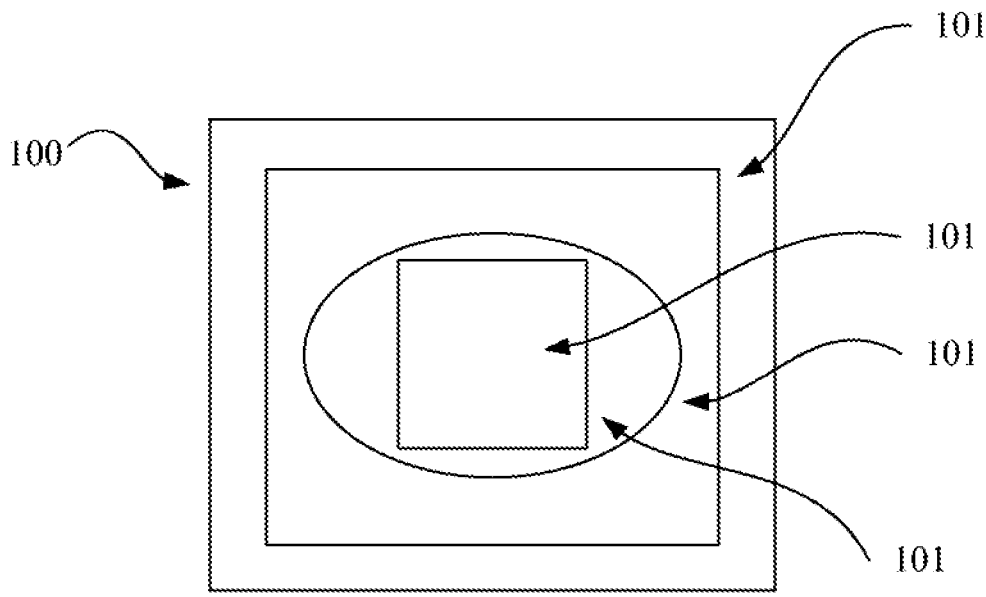
FIG. 7 represents a fifth schematic diagram of dividing a detection image into a plurality of first subregions according to some embodiments of the present disclosure.

Certainly, different boundary lines may have the same or different shapes. For example, as shown in FIG. 5, the detection image 500 is a circular region, and is divided into a plurality of concentric first subregions, wherein the boundary line between the first subregion 501-1 and the first subregion 501-2 as well as the boundary line surrounding the first subregions 501-1, 501-2, 501-3 and 501-4 are circular, and the boundary line between the first subregion 501-2 and the first subregion 501-3 as well as the boundary line between the first subregion 501-3 and the first subregion 501-4 are rectangular.

In other words, the boundary lines of the first subregions away from the center of the detection image may have the same shape (for example, circle, rectangle, oval, or the like) or different shapes, or a part of the boundary lines has the same shape. It should be further noted that the shape of each boundary line, the size of each subregion and the positional relationship between subregions may be adjusted as needed, and are not limited thereto.

It should be noted that since the template image and the detection image are divided into a plurality of subregions according to the same preset rule, only the division rule of the detection image is shown in Figures, and the division rule of the template image is not illustrated repeatedly.

Optionally, as shown in FIG. 1, the detection image 100 is set to be a circular region, and the detection image 100 may be divided into a plurality of concentric first subregions, wherein one first subregion 101-1 is a circular region, and other first subregions (for example, first subregions 101-2, 101-3 and 101-4) are circular ring-shaped regions. The circular region and circular ring-shaped regions have unchanged pixels before and after rotation, which may further improve the accuracy of the acquired principal direction of rotation of the image.

In some embodiments, the step of dividing the detection image into a plurality of first subregions according to the same preset rule is as below.

The detection image is divided into n first subregions by using n concentric circles with radii different from each other, and the centers of the n concentric circles of the detection image coincide with the center of the detection image. Optionally, the $i^{th}$ concentric circle of the n concentric circles has a radius of $r_i$, wherein i≤n, i is a positive integer, $r_{i-1}<r_i$, and $r_0≥0$. One of the first subregions of the detection image is a circular region with a radius of $r_1$, and any one of other first subregions is a circular ring-shaped region between two adjacent circular regions. To be specific, the concentric circle with a radius of $r_1$ defines the first one of the n first subregions, that is, a circular region with a radius of $r_1$; the circular ring-shaped region between the $j^{th}$ circle and the $(j+1)^{th}$ circle defines the $(j+1)^{th}$ first subregion of the n first subregions, wherein j is a positive integer and runs from 1 to n−1, and n is an integer greater than or equal to 2. In other words, the region with a radius less than $r_i$ and greater than $r_{i-1}$ is defined as the $i^{th}$ subregion of the n first subregions, wherein the value of i runs from 1 to n, and $r_0=0$.

In some embodiments, the step of dividing the corresponding template image into a plurality of second subregions is as below.

The template image is divided into n second subregions by using n concentric circles with radii different from each other, the centers of the n concentric circles of the template image coincide with the center of the template image, one of the second subregions of the template image is a circular region with a radius of $r_1$, and any one of other second subregions is a circular ring-shaped region between two adjacent circles of the n concentric circles, wherein the smallest circle of the n concentric circles has a radius of $r_1$. The way of dividing the template image into a plurality of second subregions is similar to that of dividing the detection image into a plurality of first subregions, so it can refer to the above-mentioned contents, and is not repeated herein.

Correspondingly, the step of calculating the principal rotation direction $α_i$ of the $i^{th}$ first subregion of the detection image with respect to the second subregion corresponding to the first subregion is as below.

The principal rotation direction $α_i$ of the circle with a radius of $r_i$ of the detection image with respect to the circle with a radius of $r_i$ of the template image is calculated. In the case that the first subregion is a circular region, the circle corresponding to the first subregion has a radius of $r_1$. In the case that the first subregion is a circular ring-shaped region, the circle corresponding to the first subregion has a relatively large radius.

In the above-mentioned step, the detection image is a circular region, and the detection image and the template image are divided into a plurality of subregions by a plurality of concentric circles.

Further, the radii of the plurality of concentric circles can be also set to increase progressively in an arithmetic progression, that is, $r_i-r_{i-1}=d$ ($d=r_n/n$, $r_0=0$), so that the plurality of first subregions is distributed evenly, and the accuracy of the acquired principal rotation direction of the image can be further improved.

In the present embodiment, the calculating the principal rotation direction of the detection image according to the principal rotation directions of all first subregions of the detection image includes following steps: step S1 of setting that i=1; step S2 of comparing $α_i$ with $α_{i+1}$, and adjusting the principal direction of rotation of the detection image $$α = \arctan\left(\frac{\sum_{u=1}^{u=i+1} \sin α_u}{\sum_{u=1}^{u=i+1} \cos α_u}\right)$$

in the case that $|α_i-α_{i+1}|≤ω$, wherein u≤n, and u is a positive integer; step S3 of assigning i=i+1; and repeating steps S2 and S3 in the case that i is less than n.

In the above-mentioned steps, the principal rotation directions of all the subregions are sorted firstly, so as to form a sequence of $α_1, α_2, α_3, \ldots α_n$, then the initial principal rotation direction of the detection image is set to be $α_1$, and the principal rotation directions of all the subregions are traversed in sequence. In the case that the angle of the principal rotation direction of the next subregion with respect to the former subregion is not greater than ω, it is considered that the principal rotation direction of the next subregion is valid, and the principal rotation direction of the detection image is adjusted according to the above-mentioned formula. In the case that the angle of the principal rotation direction of the next subregion with respect to the former subregion is greater than ω, it is considered that the principal rotation direction of the next subregion is invalid, and the principal rotation direction of the detection image is not adjusted.

In some embodiments, ω is set according to a change in a reasonable pose of the target. Usually, it is set that 0°≤ω≤60°, which can satisfy the demand of identification detection of most of the targets. Preferably, it is set that ω=45°.

To be specific, before the step S1, the principal rotation directions of all the subregions are sorted, and subsequent to sorting, $α_i>α_{i+1}$, such that the principal rotation directions of all the subregions are sorted from large to small, so as to form a sequence of $α_1, α_2, α_3, \ldots α_n$.

Certainly, the rule of sorting the principal rotation directions of all the subregions is not limited thereto. For example, the principal rotation directions of all the subregions can be sorted from small to large, or sorted according to a distance of the subregion from the center of the detection image, and its sorting manner is not enumerated herein.

The principal rotation direction of the image is acquired by adopting the angle between the radial direction and the gradient direction of the pixel point. Therefore, it needs to calculate the radial direction and the gradient direction of the pixel point.

Figure 2:
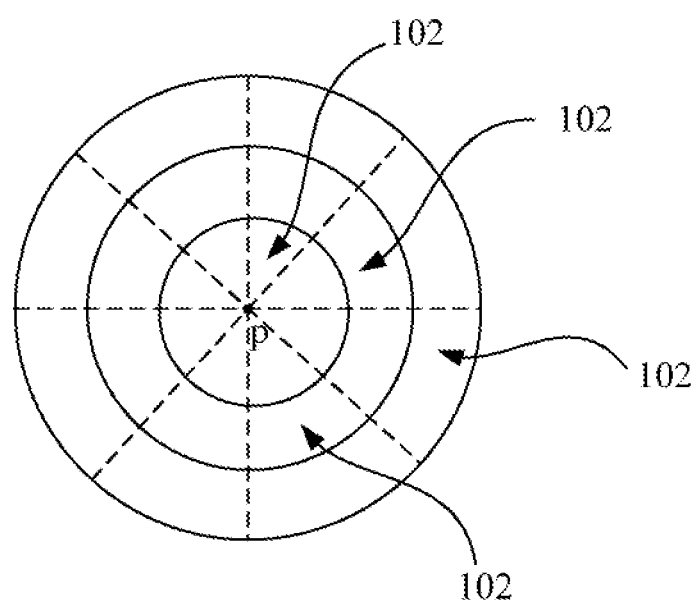
FIG. 2 represents a schematic diagram of dividing a circular region into a plurality of third subregions with a pixel point p on an outer contour line of each of the first subregions as a center of the circular region according to some embodiments of the present disclosure.

To be specific, as shown in FIG. 2, the step of calculating the gradient direction $θ_p$ of one pixel point p on the outer contour line of each of the first subregions of the detection image includes: selecting a circular region with the pixel point p as a center of the circular region, dividing the circular region into v concentric circles with the pixel point p as a center of the circles, and equally dividing the circular region into w sector regions with the pixel point p as a vertex of the sector regions, to obtain v*w third subregions 102; calculating a sum θ of gradient directions of all the pixel points in each of the third subregions 102; and calculating a gradient direction $θ_p$ of the pixel point p, wherein $θ_p$ is a sum of products of θ of all the third subregions 102 and corresponding assigned weights ε, and ε is directly proportional to a distance between a central point of the third subregion 102 and the pixel point p.

Since the pixels of the circular region before and after the image rotation keep constant, in the above-mentioned steps, the gradient direction of this point is calculated for each pixel point p on the outer contour line of the first subregion by using a circular local neighborhood, and the gradient direction of each of the pixel points p can be acquired accurately.

To be specific, the circular region may be divided into two concentric circles with the pixel point p as a center of the circles, and the circular region is equally divided into 8 sector regions with the pixel point p as the vertex of the sector regions, thereby dividing the circular region into 16 third subregions 102.

In the present disclosure, since the detection image and the template image are divided into a plurality of subregions according to the same preset rule, the above-mentioned method may be also used to calculate the gradient direction $\theta_p'$ of one pixel point p' on the outer contour line of each of the second subregions of the template image.

To be specific, the step of calculating a gradient direction $\theta_p'$ of one pixel point p' on an outer contour line of each of the second subregions of the template image includes: selecting a circular region with the pixel point p' as a center of the circular region, dividing the circular region into v concentric circles with the pixel point p' as a center of the circles, and equally dividing the circular region into w sector regions with the pixel point p' as a vertex of the sector regions, thereby dividing the circular region into v*w fourth subregions; calculating a sum $\theta'$ of gradient directions of all the pixel points p' in each of the fourth subregions; and calculating a gradient direction $\theta_p'$ of the pixel point p'; wherein $\theta_p'$ is a sum of products of $\theta'$ of all the fourth subregions and corresponding assigned weights $\varepsilon'$, and $\varepsilon'$ is directly proportional to a distance between a central point of the fourth subregion and the pixel point p'.

In the foregoing, the gradient direction $\theta_p$ of one pixel point p on the outer contour line of each of the first subregions of the detection image and the gradient direction $\theta_p'$ of one pixel point p' on the outer contour line of each of the second subregions of the template image are calculated by using the circular local neighborhood of the pixel point.

It should be noted that the gradient direction $\theta_p$ of one pixel point p on the outer contour line of each of the first subregions of the detection image and the gradient direction $\theta_p'$ of one pixel point p' on the outer contour line of each of the second subregions of the template image may be calculated by using a different method. Certainly, the method for calculating the gradient direction of the pixel point is not limited to the above-mentioned method.

Figure 3:
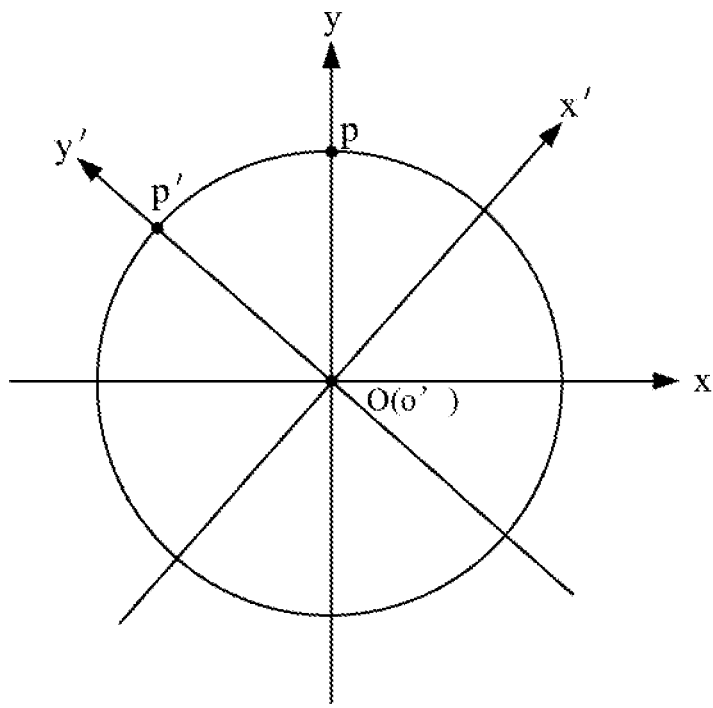
FIG. 3 represents a coordinate system including one pixel point p on an outer contour line of the first subregion of the detection image and one pixel point p' on an outer contour line of the second subregion of the template image according to some embodiments of the present disclosure.

In the present embodiment, as shown in FIG. 3, the step of calculating a radial direction $\varphi_p$ of one pixel point p on an outer contour line of each of the first subregions of the detection image includes: establishing a coordinate system xoy with a center of the detection image as an origin; and calculating a radial direction $\varphi_p$ of one pixel point p on an outer contour line of each of the first subregions using an equation:

$$\varphi_p = \arctan\frac{\Delta p_y}{\Delta p_x},$$

wherein ($\Delta p_x$, $\Delta p_y$) is coordinates of the pixel point p in the coordinate system xoy, and $0 \leq \varphi_p < 2\pi$.

Similarly, the step of calculating a radial direction $\varphi_p'$ of one pixel point p' on an outer contour line of each of the second subregions of the template image includes: establishing a coordinate system x'o'y' with a center of the template image as an origin; and calculating a radial direction $\varphi_p'$ of one pixel point p' on an outer contour line of each of the second subregions using an equation:

$$\varphi_p' = \arctan\frac{\Delta p_y'}{\Delta p_x'},$$

wherein ($\Delta p_x'$, $\Delta p_y'$) is coordinates of the pixel point p' in the coordinate system x'o'y', and $0 \leq \varphi_p' < 2\pi$.

Since the detection image has the same shape and size as the template image, and the detection image and the template image are divided into a plurality of subregions according to the same preset rule, one pixel point p on the outer contour line of the first subregion of the detection image and one pixel point p' on the outer contour line of the corresponding second subregion of the template image are shown schematically in FIG. 3, wherein the pixel point p corresponds to the pixel point p' in position.

In FIG. 3, the outer contour lines of the first subregion of the detection image and the second subregion of the template image are circular. It should be noted that the outer contour lines of the first subregion of the detection image and the second subregion of the template image may be also elliptic, rectangular, or the like.

In the present embodiment, the detection image is a circular region, and the acquiring the principal rotation direction of the detection image with respect to the template image in the image processing method includes the following steps.

The detection image is divided into n first subregions by using n concentric circles with radii different from each other, and the centers of the n concentric circles of the detection image coincide with the center of the detection image. Optionally, the ith concentric circle of the n concentric circles has a radius of $r_i$, wherein $i \leq n$, i is a positive integer, and $r_i < r_{i+1}$. One of the first subregions of the detection image is a circular region with a radius of $r_1$, and any one of other first subregions is a circular ring-shaped region between two adjacent circular regions.

The template image is divided into n second subregions by using n concentric circles with radii different from each other, the centers of the n concentric circles of the template image coincide with the center of the template image, one of the second subregions of the template image is a circular region with a radius of $r_1$, and any one of other second subregions is a circular ring-shaped region located between two adjacent circles, wherein the smallest circle of the n concentric circles has a radius of $r_1$.

The principal rotation direction $\alpha_i$ of the circle with a radius of $r_i$ corresponding to each of the first subregions with respect to the circle with a radius of $r_i$ of the template image is calculated. In the case that the first subregion is a circular region, the circle corresponding to the first subregion has a radius of $r_1$. In the case that the first subregion is a circular ring-shaped region, the circle corresponding to the first subregion has a relatively large radius. $\alpha_i$ is an average value of sums of difference values of $\Delta p$ of all pixel points p on an outer contour line of each first subregion of the detection image and $\Delta p'$ of pixel points p' on an outer contour line of the corresponding second subregion, wherein $\Delta p$ is an angle between a radial direction and a gradient direction of each pixel point p, and $\Delta p'$ is an angle between a radial direction and a gradient direction of each pixel point p'.

The principal rotation directions of all the subregions are sorted, so as to form a sequence of $\alpha_1, \alpha_2, \alpha_3, \ldots \alpha_n$, wherein $\alpha_i > \alpha_{i+1}$, and the initial principal rotation direction of the detection image is set to be $\alpha_1$.

The calculating the principal rotation direction of the detection image according to the principal rotation directions of all first subregions of the detection image includes: step S1 of setting that i=1; step S2 of comparing $\alpha_i$ with $\alpha_{i+1}$, and adjusting the principal direction of rotation of the detection image using an equation:

$$\alpha = \arctan\left(\frac{\sum_{u=1}^{u=i+1} \sin\alpha_u}{\sum_{u=1}^{u=i+1} \cos\alpha_u}\right)$$

in the case that $|\alpha_i - \alpha_{i+1}| \leq \omega$, wherein $u \leq n$, and u is a positive integer; step S3 of assigning i=i+1; and repeating steps S2 and S3 in the case that i is less than n.

So far, the principal rotation direction α of the detection image with respect to the template image is acquired.

The gradient directions of the pixel point p on the outer contour line of the first subregion and the pixel point p' on the outer contour line of the second subregion may be calculated by using the circular local neighborhood. The radial direction of the pixel point p on the outer contour line of the first subregion may be acquired by establishing a coordinate system with the center of the detection image as an origin. Similarly, the radial direction of the pixel point p' on the outer contour line of the second subregion may be acquired by establishing a coordinate system with the center of the template image as an origin. The specific method has been described in the above, and is not described in detail herein.

In the above-mentioned image processing method, the detection image is divided into a plurality of first subregions by using a plurality of concentric circles, the template image is divided into a plurality of second subregions according to the same rule. By acquiring the principal rotation direction of each of the first subregions with respect to the corresponding second subregion, the principal rotation direction of the entire detection image with respect to the template image is acquired. Since the first subregion and the corresponding second subregion are circular regions or circular ring-shaped regions, the pixels before and after the image rotation keep constant, thereby improving the accuracy and precision of the acquired principal rotation direction.

In the above-mentioned image processing method, the sequential order of the steps is not defined, and can be reasonably adjusted as long as the technical solution of the present disclosure may be implemented.

In the present embodiment, an image processing device is provided, including an image rotation processing module, configured to acquire the principal rotation direction of the image. In the image processing device, firstly, the detection image is rotated according to the principal rotation direction, so that a pose of the detection image is the same as that of the template image, without a rotation angle, and then the feature extraction and matching are performed on the rotated detection image and template image, so as to realize the identification detection of the target. Since the rotated detection image has the same pose as the template image, without a rotation angle, the subsequent image identification processing algorithm may not have the rotation invariance, which simplifies the image identification processing algorithm and improves the reliability of the image identification detection.

The image rotation processing module includes an acquiring module, configured to acquire the principal rotation direction of the detection image with respect to the template image.

The acquiring module includes: a first dividing unit, a calculating unit and an acquiring unit.

The first dividing unit is configured to, according to the same preset rule, divide the detection image into a plurality of first subregions, and divide the template image into a plurality of second subregions, wherein the centers of the plurality of first subregions coincide with the center of the detection image, and the centers of the plurality of second subregions coincide with the center of the template image.

The calculating unit is configured to calculate a principal rotation direction of each of the plurality of first subregions of the detection image with respect to the corresponding second subregion, wherein the principal rotation direction of the first subregion with respect to the corresponding second subregion is an average value of sums of difference values of Δp of all pixel points p on an outer contour line of the first subregion and Δp' of corresponding pixel points p' on an outer contour line of the corresponding second subregion, Δp is an angle between a radial direction and a gradient direction of each pixel point p, and Δp' is an angle between a radial direction and a gradient direction of each pixel point p'.

The acquiring unit is configured to calculate a principal rotation direction α of the detection image according to the principal rotation directions of the plurality of first subregions of the detection image.

In the above-mentioned image processing device, firstly, the detection image and the template image are divided into a plurality of subregions according to the same rule, a principal rotation direction of each of the plurality of first subregions of the detection image with respect to the corresponding subregion of the template image is calculated, and then the principal rotation direction of the detection image is calculated according to the principal rotation directions of all the subregions of the detection image, wherein the principal rotation direction of each subregion of the detection image with respect to the corresponding subregion of the template image is an average value of sums of difference values of an angle between the radial direction and the gradient direction of each of all pixel points on an outer contour line of each of the subregions of the detection image and an angle between the radial direction and the gradient direction of the corresponding pixel point on an outer contour line of the corresponding subregion of the template image. By adopting the angle between the radial direction and the gradient direction of the pixel point, the principal rotation direction of the image is acquired, with a relatively high accuracy and precision. By rotating the detection image in the principal rotation direction, the detection image has the same pose as the template image, without a rotation angle, so the subsequent image identification processing algorithm may not have the rotation invariance, which simplifies the image identification processing algorithm and improves the reliability of the image identification detection.

Preferably, as shown in FIG. 1, the detection image 100 is set to be a circular region, and the detection image 100 is divided into a plurality of first subregions 101 using a plurality of concentric circles, wherein one first subregion is a circular region, and other first subregions are circular ring-shaped regions, and the pixels of the circular region and the circular ring-shaped regions before and after the rotation keep constant, which may further improve the precision of the acquired principal direction of rotation of the image.

Correspondingly, the first dividing unit includes a first dividing subunit and a second dividing subunit.

The first dividing subunit is configured to divide the detection image into n first subregions by using n concentric circles with radii different from each other, wherein the centers of the n concentric circles of the detection image coincide with the center of the detection image, the $i^{th}$ concentric circle of the n concentric circles has a radius of $r_i$, i is a positive integer and runs from 1 to n, $r_{i-1} < r_i$, and $r_0 \geq 0$. One of the first subregions of the detection image is a circular region with a radius of $r_1$, and any one of other first subregions is a circular ring-shaped region between two adjacent circular regions of the n concentric circles.

The second dividing subunit is configured to divide the template image into n second subregions by using n concentric circles with radii different from each other; wherein the centers of the n concentric circles of the template image coincide with the center of the template image, one of the second subregions of the template image is a circular region with a radius of $r_1$, any one of other second subregions is a circular ring-shaped region located between two adjacent circles, and the smallest circle of the n concentric circles has a radius of $r_1$.

The calculating unit is further configured to calculate the principal rotation direction $\alpha_i$ of the circle with a radius of $r_i$ corresponding to each of the first subregions with respect to the circle with a radius of $r_i$ of the template image. In the case that the first subregion is a circular region, the circle corresponding to the first subregion has a radius of $r_1$. In the case that the first subregion is a circular ring-shaped region, the circle corresponding to the first subregion has a relatively large radius.

In the above image processing device, the detection image is set to be the circular region, and the detection image and the template image are divided into a plurality of subregions by a plurality of concentric circles.

In the present disclosure, the principal rotation direction of the image is acquired by adopting the angle between the radial direction and the gradient direction of the pixel point. Therefore, it needs to calculate the radial direction and the gradient direction of the pixel point.

To be specific, the calculating unit includes a first calculating unit configured to calculate the gradient direction $\theta_p$ of one pixel point p on each of the first subregions of the detection image.

The first calculating unit includes: a first selecting unit, configured to select one circular region with a pixel point p as a center of the circular region; a second dividing unit, configured to divide the circular region into v concentric circles with the pixel point p as a center of the circles, and equally divide the circular region into w sector regions with the pixel point p as a vertex of the sector regions, to obtain v*w third subregions; a first calculating subunit, configured to calculate a sum $\theta$ of gradient directions of all the pixel points p in each of the third subregions; and a second calculating subunit, configured to calculate a gradient direction $\theta_p$ of the pixel point p, wherein $\theta_p$ is a sum of products of $\theta$ of all the third subregions and corresponding assigned weights c, and c is directly proportional to a distance between a central point of the third subregion and the pixel point p.

Since the pixels of the circular region before and after the image rotation keep constant, in the above-mentioned steps, the gradient direction of this point is calculated for each pixel point p on the outer contour line of the first subregion by using a circular local neighborhood, and the gradient direction of each of the pixel points p can be acquired accurately.

In the present disclosure, since the detection image and the template image are divided into a plurality of subregions according to the same preset rule, the above-mentioned method may be also used to calculate the gradient direction $\theta_p'$ of one pixel point p' on the outer contour line of each of the second subregions of the template image.

To be specific, the calculating unit further includes a second calculating unit configured to calculate the gradient direction $\theta_p'$ of one pixel point p' on each of the second subregions of the template image.

The second calculating unit includes: a second selecting unit, configured to select one circular region with a pixel point p' as a center of the circular region; a third dividing unit, configured to divide the circular region into v concentric circles with the pixel point p' as a center of the circles, and equally divide the circular region into w sector regions with the pixel point p' as a vertex of the sector regions, to obtain v*w fourth subregions; a third calculating subunit, configured to calculate a sum $\theta'$ of gradient directions of all the pixel points p' in each of the fourth subregions; and a fourth calculating subunit, configured to calculate a gradient direction $\theta_p'$ of the pixel point p', wherein $\theta_p'$ is a sum of products of $\theta'$ of all the fourth subregions and respective corresponding assigned weights $\varepsilon'$, $\varepsilon'$ is directly proportional to a distance between a central point of the fourth subregion and the pixel point p'.

In the above-mentioned image processing device, the gradient direction $\theta_p$ of one pixel point p on the outer contour line of each of the first subregions of the detection image and the gradient direction $\theta_p'$ of one pixel point p' on the outer contour line of each of the second subregions of the template image are calculated by using a circular local neighborhood of the pixel point.

It should be noted that the gradient direction $\theta_p$ of one pixel point p on the outer contour line of each of the first subregions of the detection image and the gradient direction $\theta_p'$ of one pixel point p' on the outer contour line of each of the second subregions of the template image may be calculated by using a different method. Certainly, the method for calculating the gradient direction of the pixel point is not limited to the above-mentioned method.

In the present embodiment, as shown in FIG. 3, the calculating unit further includes a third calculating unit, configured to calculate a radial direction $\varphi_p$ of one pixel point p on an outer contour line of each of the first subregions of the detection image.

The third calculating unit includes: a first coordinate system establishing unit, configured to establish a coordinate system xoy with a center of the detection image as an origin; and a fifth calculating subunit, configured to calculate a radial direction of one pixel point p on an outer contour line of each of the first subregions using an equation $$\varphi_p = \arctan\frac{\Delta p_y}{\Delta p_x},$$

wherein $(\Delta p_x, \Delta p_y)$ is a coordinate of the pixel point p in the coordinate system xoy, and $0 \leq \varphi_p < 2\pi$.

Similarly, the calculating unit further includes a fourth calculating unit, configured to calculate a radial direction $\varphi_p'$ of one pixel point p' on an outer contour line of each of the second subregions of the template image.

The fourth calculating unit includes: a second coordinate system establishing unit, configured to establish a coordinate system x'o'y' with a center of the template image as a central point; and a sixth calculating subunit, configured to calculate a radial direction of one pixel point p' on an outer contour line of each of the second subregions using an equation $$\varphi_p' = \arctan\frac{\Delta p_y'}{\Delta p_x'},$$

wherein $(\Delta p_x', \Delta p_y')$ is a coordinate of the pixel point p' in the coordinate system x'o'y', and $0 \leq \varphi_p' < 2\pi$.

In the present embodiment, the detection image is a circular region. For the image processing device, the acquiring module of its image rotation processing module includes a first dividing unit, a calculating unit and an acquiring unit.

The first dividing unit includes a first dividing subunit and a second dividing subunit. The first subdividing unit is configured to divide the detection image into n first subregions by using n concentric circles with radii different from each other, and the centers of the n concentric circles of the detection image coincide with the center of the detection image, wherein $i \leq n$, i is a positive integer, $r_{i-1} < r_i$, and $r_0 \geq 0$. Optionally, one of the first subregions of the detection image is a circular region with a radius of $r_1$, and any one of other first subregions is a circular ring-shaped region located between two adjacent circular regions. The second dividing subunit is configured to divide the template image into n second subregions by using n concentric circles with radii different from each other, and the centers of the n concentric circles of the template image coincide with the center of the template image. Optionally, one of the second subregions of the template image is a circular region with a radius of $r_1$, and any one of other second subregions is a circular ring-shaped region located between two adjacent circles.

The calculating unit is configured to calculate the principal rotation direction of the circle with a radius of $r_i$ of the detection image with respect to the circle with a radius of $r_i$ of the template image, to be determined as the principal rotation direction $\alpha_i$ of the $i^{th}$ first subregion with respect to the corresponding second subregion. In the case that the first subregion is a circular region, the circle corresponding to the first subregion has a radius of $r_1$. In the case that the first subregion is a circular ring-shaped region, the circle corresponding to the first subregion has a relatively large radius. $\alpha_i$ is an average value of sums of difference values of $\Delta p$ of all pixel points p on an outer contour line of each first subregion of the detection image and $\Delta p'$ of corresponding pixel points p' on an outer contour line of the second subregion corresponding to the first subregion, wherein $\Delta p$ is an angle between a radial direction and a gradient direction of each pixel point p, and $\Delta p'$ is an angle between a radial direction and a gradient direction of each pixel point p'.

The acquiring unit is configured to calculate the principal rotation direction of the detection image according to the principal rotation directions of all first subregions of the detection image.

The calculating unit may be configured to calculate the gradient directions of the pixel points p on the outer contour line of the first subregion and the pixel points p' on the outer contour line of the second subregion by using the circular local neighborhood. The radial direction of each pixel point p on the outer contour line of the first subregion may be obtained by establishing a coordinate system with the center of the detection image as the origin. Similarly, the radial direction of the pixel point p' on the outer contour line of the second subregion may be obtained by establishing a coordinate system with the center of the template image as the origin. The specific implementation structure has been described in the above, and is not described in detail herein In the above-mentioned image processing device, the detection image is divided into a plurality of first subregions by using a plurality of concentric circles, and the template image is divided into a plurality of second subregions according to the same rule. By acquiring the principal rotation direction of each of the first subregions with respect to the corresponding second subregion, the principal rotation direction of the entire detection image with respect to the template image is acquired. Since the first subregion and the corresponding second subregion are circular regions or circular ring-shaped regions, the pixels before and after the image rotation keep constant, thereby improving the accuracy and precision of the acquired principal direction of rotation.

The foregoing is merely to describe preferably embodiments of the present disclosure. It should be noted that several improvements and modifications may be made for a person skilled in the art without departing from the technical principle of the present disclosure, and should be also considered as the protection scope of the present disclosure.

What is claimed is:

1. An image processing method, comprising:
   dividing a detection image into a plurality of first subregions, and dividing a template image into a plurality of second subregions, wherein a center of each of the plurality of first subregions coincides with a center of the detection image, a center of each of the plurality of second subregions coincides with a center of the template image, and the plurality of first subregions is in one-to-one correspondence to the plurality of second subregions;
   calculating a principal rotation direction of each of the plurality of first subregions with respect to corresponding second subregion, wherein the principal rotation direction of the first subregion with respect to the corresponding second subregion is an average value of sums of difference values of $\Delta p$ of all pixel points p on an outer contour line of the first subregion and $\Delta p'$ of corresponding pixel points p' on an outer contour line of the corresponding second subregion, $\Delta p$ is an angle between a radial direction and a gradient direction of each pixel point p, and $\Delta p'$ is an angle between a radial direction and a gradient direction of each pixel point p'; and
   calculating a principal rotation direction $\alpha$ of the detection image according to the principal rotation directions of the plurality of first subregions of the detection image.

2. The image processing method according claim 1, wherein the calculating the principal rotation direction $\alpha$ of the detection image according to the principal rotation directions of the plurality of first subregions of the detection image comprises:
   step S1 of setting i=1;
   step S2 of comparing $\alpha_i$ with $\alpha_{i+1}$, and adjusting the principal rotation direction of the detection image using an equation:

$$\alpha = \arctan\left(\frac{\sum_{u=1}^{u=i+1} \sin\alpha_u}{\sum_{u=1}^{u=i+1} \cos\alpha_u}\right)$$

in the case that $|\alpha_i - \alpha_{i+1}| \leq \omega$, wherein $u \leq n$, u is a positive integer, and $\alpha_i$ represents the principal rotation direction of an $i^{th}$ first subregion of the plurality of first subregions;
   step S3 of assigning i=i+1; and
   in the case that i is less than n, repeating steps S2 and S3, wherein n represents the number of the plurality of first subregions.

3. The image processing method according to claim 2, wherein before the step S1, the image processing method further comprises:
   sorting the principal rotation directions of the plurality of first subregions such that $\alpha_i > \alpha_{i+1}$.

4. The image processing method according to claim 2, wherein $\omega = 45°$.

5. The image processing method according to claim 1, wherein before the step of calculating a principal rotation direction of each of the plurality of first subregions with respect to corresponding second subregion, the image processing method further comprises:
   selecting a circular region with one pixel point p on an outer contour line of each of the first subregions as a center of the circular region, dividing the circular region into v concentric circles with the pixel point p as a center of the circles, and equally dividing the circular region into w sector regions with the pixel point p as a vertex of the sector regions, to obtain v*w third subregions, wherein v and w are positive integers greater than or equal to 2;
   calculating a sum $\theta$ of gradient directions of all the pixel points in each of the third subregions; and
   calculating a gradient direction $\theta_p$ of the pixel point p, wherein $\theta_p$ is a sum of products of $\theta$ of all the third subregions and corresponding assigned weights $\varepsilon$, and $\varepsilon$ is directly proportional to a distance between a central point of the third subregion and the pixel point p.

6. The image processing method according to claim 5, wherein the dividing the circular region into v concentric circles with the pixel point p as a center of the circles, and equally dividing the circular region into w sector regions with the pixel point p as a vertex of the sector regions, to obtain v*w third subregions comprises:
   dividing the circular region into two concentric circles with the pixel point p as the center of the circles, and dividing the circular region into 8 sector regions with the pixel point p as the vertex of the sector regions, to obtain 16 third subregions.

7. The image processing method according to claim 5, wherein before the step of calculating a principal rotation direction of each of the plurality of first subregions with respect to corresponding second subregion, the image processing method further comprises:
   selecting a circular region with one pixel point p' on an outer contour line of each of the second subregions as a center of the circular region, dividing the circular region into v concentric circles with the pixel point p' as a center of the circles, and equally dividing the circular region into w sector regions with the pixel point p' as a vertex of the sector regions, to obtain v*w fourth subregions;
   calculating a sum $\theta'$ of gradient directions of all the pixel points in each of the fourth subregions; and
   calculating a gradient direction $\theta_p'$ of the pixel point p', wherein $\theta_p'$ is a sum of products of $\theta'$ of all the fourth subregions and corresponding assigned weights $\varepsilon'$, $\varepsilon'$ is directly proportional to a distance between a central point of the fourth subregion and the pixel point p', and v and w are positive integers greater than or equal to 2.

8. The image processing method according to claim 1, wherein:
   the detection image is a circular region;
   the dividing the detection image into a plurality of first subregions comprises:
   defining a region where a distance from the center of the detection image is less than $r_i$ and greater than $r_{i-1}$ as the $i^{th}$ first subregion of the plurality of first subregions, wherein $r_{i-1} < r_i$, $r_0 = 0$, i is a positive integer and runs from 1 to n, and n represents the number of the first subregions;
   the dividing the template image into a plurality of second subregions comprises:
   defining a region where a distance from the center of the template image is less than $r_i$ and greater than $r_{i-1}$ as the $i^{th}$ second subregion of the plurality of second subregions, wherein $r_{i-1} < r_i$, $r_0 \geq 0$, i is a positive integer and runs from 1 to n, and n represents the number of the second subregions; and
   the calculating a principal rotation direction of each of the plurality of first subregions of the detection image with respect to corresponding second subregion comprises:
   determining the principal rotation direction of the detection image with a radius of $r_i$ with respect to the template image with a radius of $r_i$ as the principal rotation direction $\alpha_i$ of the $i^{th}$ first subregion with respect to the corresponding second subregion.

9. The image processing method according to claim 8, wherein before the step of calculating a principal rotation direction of each of the plurality of first subregions with respect to corresponding second subregion, the image processing method further comprises:
   establishing a coordinate system with a center of the detection image as an origin; and
   calculating a radial direction $\varphi_p$ of one pixel point p on an outer contour line of each of the first subregions using an equation $$\varphi_p = \arctan \frac{\Delta p_y}{\Delta p_x},$$

wherein $(\Delta p_x, \Delta p_y)$ is coordinates of the pixel point p, and $0 \leq \varphi_p < 2\pi$.

10. The image processing method according to claim 8, wherein before the step of calculating a principal rotation direction of each of the plurality of first subregions with respect to corresponding second subregion, the image processing method further comprises:
    establishing a coordinate system with a center of the template image as an origin; and
    calculating a radial direction $\varphi_p'$ of one pixel point p' on an outer contour line of each of the second subregions using an equation $$\varphi_p' = \arctan \frac{\Delta p_y'}{\Delta p_x'},$$

wherein $(\Delta p_x', \Delta p_y')$ is coordinates of the pixel point p', and $0 \leq \varphi_p' < 2\pi$.

11. An image processing device, comprising: a processor and a memory, wherein the processor is configured to execute a program stored in the memory, so as to:
    divide a detection image into a plurality of first subregions, and divide a template image into a plurality of second subregions, wherein a center of each of the plurality of first subregions coincides with a center of the detection image, a center of each of the plurality of second subregions coincides with a center of the template image, and the plurality of first subregions is in one-to-one correspondence to the plurality of second subregions;

calculate a principal rotation direction of each of the plurality of first subregions with respect to corresponding second subregion, wherein the principal rotation direction of the first subregion with respect to the corresponding second subregion is an average value of sums of difference values of Δp of all pixel points p on an outer contour line of the first subregion and Δp' of corresponding pixel points p' on an outer contour line of the corresponding second subregion, Δp is an angle between a radial direction and a gradient direction of each pixel point p, and Δp' is an angle between a radial direction and a gradient direction of each pixel point p'; and calculate a principal rotation direction α of the detection image according to the principal rotation directions of the plurality of first subregions of the detection image.

12. The image processing device according to claim 11, wherein the processor is further configured to execute following steps:

step S1 of setting i=1;

step S2 of comparing $\alpha_i$ with $\alpha_{i+1}$, and adjusting the principal rotation direction of the detection image using an equation:

$$\alpha = \arctan\left(\frac{\sum_{u=1}^{u=i+1} \sin\alpha_u}{\sum_{u=1}^{u=i+1} \cos\alpha_u}\right)$$

in the case that $|\alpha_i - \alpha_{i+1}| \le \omega$, wherein u≤n, u is a positive integer, and $\alpha_i$ represents the principal rotation direction of an $i^{th}$ first subregion of the plurality of first subregions;

step S3 of assigning i=i+1; and in the case that i is less than n, repeating steps S2 and S3, wherein n represents the number of the plurality of first subregions.

13. The image processing device according to claim 12, wherein the processor is further configured to, before the step S1, sort the principal rotation directions of the plurality of first subregions such that $\alpha_i > \alpha_{i+1}$.

14. The image processing device according to claim 12, wherein ω=45°.

15. The image processing device according to claim 11, wherein the processor is further configured to:

select a circular region with one pixel point p on an outer contour line of each of the first subregions as a center of the circular region, divide the circular region into v concentric circles with the pixel point p as a center of the circles, and equally divide the circular region into w sector regions with the pixel point p as a vertex of the sector regions, to obtain v*w third subregions, wherein v and w are positive integers greater than or equal to 2;

calculate a sum θ of gradient directions of all the pixel points in each of the third subregions; and calculate a gradient direction $\theta_p$ of the pixel point p, wherein $\theta_p$ is a sum of products of θ of all the third subregions and corresponding assigned weights c, and c is directly proportional to a distance between a central point of the third subregion and the pixel point p.

16. The image processing device according to claim 15, wherein the processor is further configured to divide the circular region into two concentric circles with the pixel point p as the center of the circles, and divide the circular region into 8 sector regions with the pixel point p as the vertex of the sector regions, to obtain 16 third subregions.

17. The image processing device according claim 15, wherein the processor is further configured to:

select a circular region with one pixel point p' on an outer contour line of each of the second subregions as a center of the circular region, divide the circular region into v concentric circles with the pixel point p' as a center of the circles, and equally divide the circular region into w sector regions with the pixel point p' as a vertex of the sector regions, to obtain v*w fourth subregions;

calculate a sum θ' of gradient directions of all the pixel points in each of the fourth subregions; and calculate a gradient direction $\theta_p'$ of the pixel point p', wherein $\theta_p'$ is a sum of products of θ' of all the fourth subregions and respective corresponding assigned weights ε', ε' is directly proportional to a distance between a central point of the fourth subregion and the pixel point p', and v and w are positive integers greater than or equal to 2.

18. The image processing device according to claim 11, wherein the detection image is a circular region, and the processor is further configured to:

define a region where a distance from the center of the detection image is less than $r_i$ and greater than $r_{i-1}$ as the $i^{th}$ first subregion of the plurality of first subregions, wherein $r_{i-1} < r_i$, $r_0=0$, i is a positive integer and runs from 1 to n, and n represents the number of the first subregions;

define a region where a distance from the center of the template image is less than $r_i$ and greater than $r_{i-1}$ as the $i^{th}$ second subregion of the plurality of second subregions, wherein $r_{i-1} < r_i$, $r_0 \ge 0$, i is a positive integer and runs from 1 to n, and n represents the number of the second subregions; and determine the principal rotation direction of the detection image with a radius of $r_i$ with respect to the template image with a radius of $r_i$ as the principal rotation direction $\alpha_i$ of the $i^{th}$ first subregion with respect to the corresponding second subregion.

19. The image processing device according to claim 18, wherein the processor is further configured to:

establish a coordinate system with a center of the detection image as an origin; and calculate a radial direction of one pixel point p on an outer contour line of each of the first subregions using an equation $$\varphi_p = \arctan\frac{\Delta p_y}{\Delta p_x},$$

wherein $(\Delta p_x, \Delta p_y)$ is coordinates of the pixel point p, and $0 \le \varphi_p < 2\pi$.

20. The image processing device according to claim 18, wherein the processor is further configured to:

establish a coordinate system with a center of the template image as an origin; and calculate a radial direction of one pixel point p' on an outer contour line of each of the second subregions to using an equation $$\varphi'_p = \arctan\frac{\Delta p'_y}{\Delta p'_x},$$

wherein $(\Delta p_x', \Delta p_y')$ is coordinates of the pixel point p', and $0 \leq \varphi_p' < 2\pi$.

\* \* \* \* \*